United States Patent [19]

Etéve et al.

[11] Patent Number: 5,223,004
[45] Date of Patent: Jun. 29, 1993

[54] METHOD FOR PRODUCING OXYGEN BY ADSORPTION SEPARATION FROM AIR

[75] Inventors: Sylvie Etéve, Fontenay aux Roses; Léon Hay, Paris; Thomas Rottner, Recloses, all of France

[73] Assignee: L'Air Liquide, Societe anonyme pour l'Etude et l'Exploitation des Procedes Georges Claude, Paris, France

[21] Appl. No.: 775,924
[22] PCT Filed: Mar. 1, 1991
[86] PCT No.: PCT/FR91/00164
§ 371 Date: Dec. 27, 1991
§ 102(e) Date: Dec. 27, 1991
[87] PCT Pub. No.: WO91/12874
PCT Pub. Date: Sep. 5, 1991

[30] Foreign Application Priority Data

Mar. 2, 1990 [FR] France ............... 90 02617

[51] Int. Cl.$^5$ .................................. B01D 53/04
[52] U.S. Cl. ................................ 55/26; 55/58; 55/62; 55/68; 55/75
[58] Field of Search ............... 55/25, 26, 58, 62, 68, 55/75

[56] References Cited

U.S. PATENT DOCUMENTS

| | | | |
|---|---|---|---|
| 3,636,679 | 1/1972 | Batta | 55/26 |
| 3,738,087 | 6/1973 | McCombs | 55/62 X |
| 4,340,398 | 7/1982 | Doshi et al. | 55/25 |
| 4,440,548 | 4/1984 | Hill | 55/26 |
| 4,512,779 | 4/1985 | Hay | 55/74 X |
| 4,519,813 | 5/1985 | Hagiwara et al. | 55/26 |
| 4,781,735 | 11/1988 | Tagawa et al. | 55/26 |
| 4,810,265 | 3/1989 | Lagree et al. | 55/26 |
| 4,840,647 | 6/1989 | Hay | 55/62 X |
| 4,917,710 | 4/1990 | Haruna et al. | 55/26 |
| 4,969,935 | 11/1990 | Hay | 55/62 X |
| 4,981,499 | 1/1991 | Hay et al. | 55/62 X |
| 5,002,591 | 3/1991 | Stanford | 55/26 |
| 5,015,271 | 5/1991 | Reiss | 55/25 |
| 5,015,272 | 5/1991 | Okada et al. | 55/26 |
| 5,026,406 | 6/1991 | Kumar | 55/26 |
| 5,042,994 | 8/1991 | Smolarek | 55/26 X |
| 5,051,115 | 9/1991 | Leitgeb et al. | 55/26 |
| 5,078,757 | 1/1992 | Rottner et al. | 55/26 |

Primary Examiner—Robert Spitzer
Attorney, Agent, or Firm—Curtis, Morris & Safford

[57] ABSTRACT

A method of adsorption separation of gases of the kind which regenerates the adsorbant by pressure variation and used two adsorbers, wherein the recompression stage includes at least one recompression stage using the oxygen produced, and a final recompression stage up to the high point of the cycle pressure using air intake without draw-off; and wherein the pressure high-point of the cycle is selected between 1.2 and 2 ×10$^5$ Pa and the pressure low-point is selected between 0.3–0.7×10$^5$ Pa, at least the final part of the desorption stage being carried out by pumping. The method is essentially relevant to the production of oxygen.

21 Claims, 2 Drawing Sheets

METHOD FOR PRODUCING OXYGEN BY ADSORPTION SEPARATION FROM AIR

The present invention relates to a process for the production of oxygen through air separation by adsorption and more particularly utilizing two adsorbers and an oxygen accumulator with a cycle for each adsorber extending over a time period T and shifting from one adsorber to the other time period T/2 including the following steps:

a) a first pressurization phase starting from the low pressure level of the cycle to an intermediate pressure level by admitting the oxygen product countercurrently;

b) a second pressurization phase from the intermediate pressure level up to approximately the high pressure level of the cycle by cocurrent admission of air without bleeding off;

c) a production phase wherein air is admitted and oxygen is bled cocurrently;

d) a phase where oxygen is bled off by partial depressurization cocurrently wherein the admission of air is interrupted;

e) a desorption phase by depressurization countercurrently down to the low pressure level of the cycle which is below atmospheric pressure.

A process of this type is known from U.S. Pat. No. 3,738,087.

It is an object of the invention to propose a process having great flexibility of use and in particular a so-called mixed "cycle" (super and sub atmospheric) while allowing improved performances whereby oxygen-enriched air is obtained having an oxygen content above 95%, while reducing the investment cost and the production cost because of a selection of appropriate areas of pressure and because of utilizing a high rate of the rotating machines (compressors and/or pumps).

In order to practice the invention according to a feature thereof, the oxygen for the pressurization in step a) is supplied from the oxygen accumulator and the other adsorber which then is operating in its step d).

According to the invention, in order to practice the process the following steps can be accomplished separately or in any combination:

the high pressure level of the cycle is selected between 1.2 and $2 \times 10^5$ Pa absolute and, preferably, between 1.4 and $1.7 \times 10^5$ Pa absolute while the low pressure level is selected between 0.3 and $0.7 \times 10^5$ Pa absolute and preferably between 0.35 and $0.5 \times 10^5$ Pa absolute and wherein the desorption phase is effected at least in its final stage by pumping;

the pressure during the production step c) is substantially isobaric to the high pressure level of cycle;

the desorption step e) incorporates a countercurrent bleeding by elution substantially at the low pressure level of the cycle;

the transfer of gas from the adsorber that is undergoing depressurization towards the adsorber which is being pressurized is carried out substantially to pressure equilibrium;

the transfer is effected in its totality cocurrently in the adsorber which is being depressurized and advantageously countercurrently for the adsorber which is undergoing pressurization;

during an initial stage, the transfer between adsorbers is done cocurrently for the adsorber being depressurized and countercurrently for the adsorber undergoing pressurization while in a succeeding stage the transfer is cocurrent for the adsorber undergoing depressurization and cocurrently for the adsorber undergoing pressurization;

between the partial depressurization step which is cocurrent and the pumping step which is countercurrent, there is provided an intermediate stage of depressurization which is countercurrent, until atmospheric pressure is reached by opening to air;

the elution step by pumping is effected at substantially constant pressure;

the low pressure stage can be subjected to slight pressure variations;

the low pressure stage is effected without bleeding by elution, especially when the low pressure level of the cycle is in the area of $0.3 \times 10^5$ Pa absolute;

the production step provides an initial stage which is isobaric followed by a terminal stage with decreasing pressure;

this terminal stage during decreasing pressure in the production step starts with the elution stage in the other adsorber effected with gas drawn off from the production flow;

the countercurrent pumping stage is started before the end of the cocurrent depressurization stage (in one adsorber) towards the adsorber undergoing partial pressurization.

Thanks to the adoption of a so-called "mixed" cycle, in an area where pressures are relatively specific and ranges narrow, one can contemplate the utilization of simpler and less expensive machines than that which is necessary during the "pressure" or "vacuum" cycles.

The energy consumed by the machines used when in the narrow range of pressures where their yield is optimal, is thus minimized.

The comparison of the specific energy for the production of high oxygen content for instance above 85% in the "mixed" cycle, to the other cycles at the maximum use of the machines can be established as follows:

compared to cycles under superatmospheric pressure, a lower amount of energy is expended;

compared to the "vacuum" cycles at a low pressure below $0.2 \times 10^5$ Pa, again lower energy is expended;

compared to the "vacuum" cycles at a low pressure maintained at $0.2/0.3 \times 10^5$ Pa, a similar amount of energy is expended.

The maintenance of a high pressure level above atmospheric pressure in the mixed cycle allows an increase in productivity compared to the "vacuum" type cycle.

The cycle according to the invention is aimed only at the production of oxygen, the other fraction of the separation includes only air fairly enriched in nitrogen. On the other hand, the specific energy required for the separation is much lower.

The rate of use of the machine in the proposed solution is very high, while certain known cycles purporting to use two adsorbers are in fact economically and industrially applicable only with three adsorbers, more often for the reason of a better rate of use of the machines.

The solution in accordance with the invention is also based on carrying out a cycle which comprises the production by bleeding which is only effected after the loading of the adsorber to the high pressure level of the cycle and preferably during an isobaric stage at this same high pressure level which consequently will bring, during this stage, the rate of loading the adsorber, in arrested nitrogen, to its maximum value for this high pressure level, a value which is not obtained during production, or part of the production, and is drawn up and is bled off during the increasing pressure The proposed solution results in improved performances The invention will now be described with reference to the drawings which:

FIG. 1 presents the evolution of pressure in an adsorber during the different steps of a complete cycle (T), with the other adsorber being subjected to the same cycle with a phase shift in time of T/2;

In the present description and the claims, the expression "oxygen" means the gas produced by the separation of air, that is considerably oxygen-enriched air or a slightly impure oxygen that is (oxygen not totally pure.)

Figure 1:
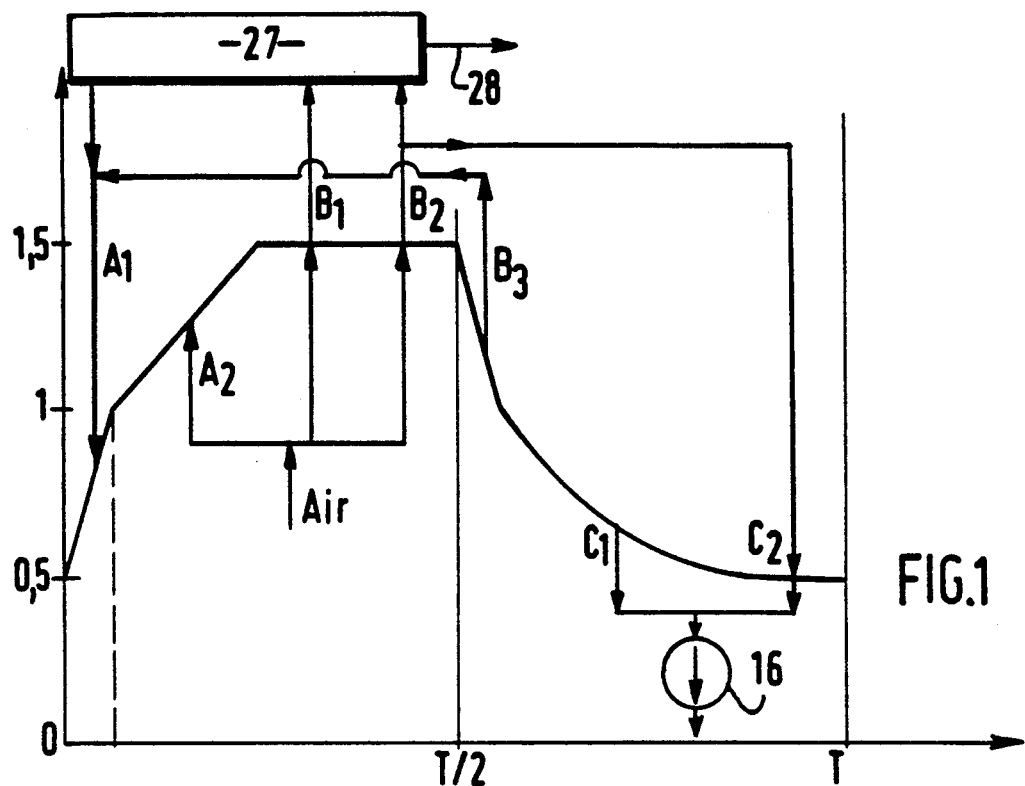
Figure 2:
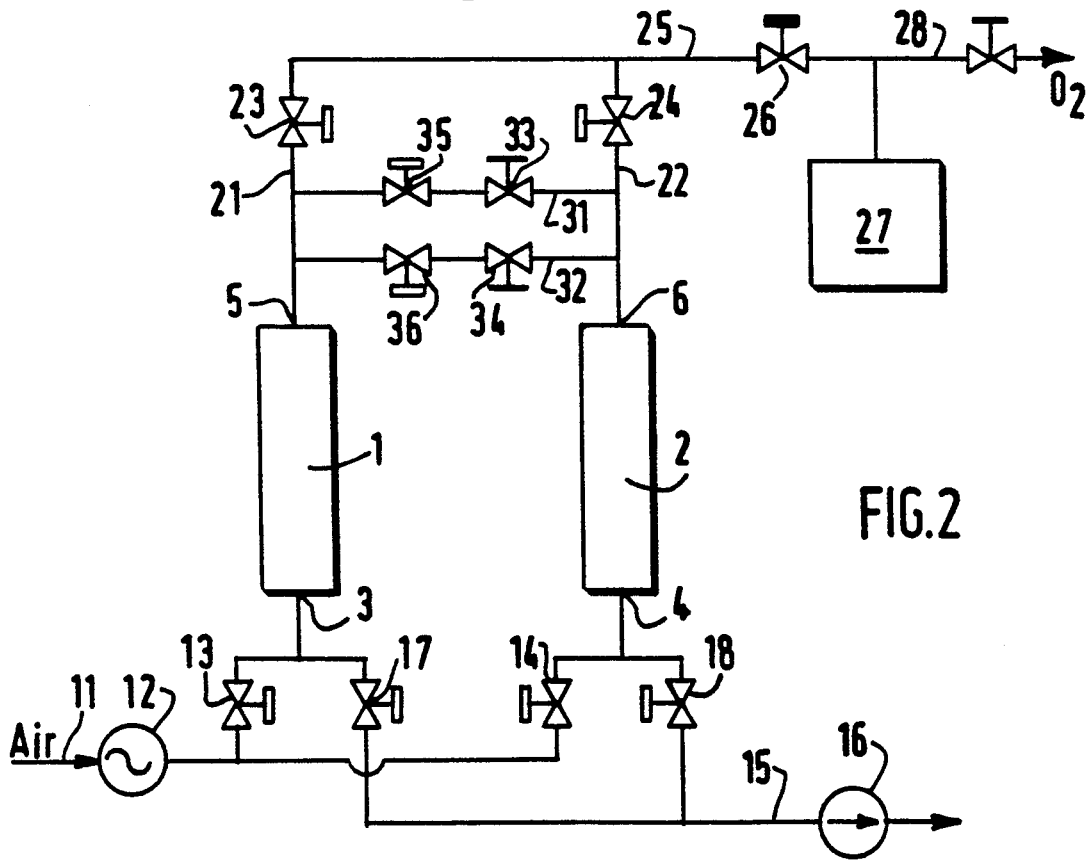
FIG. 2 is a schematic diagram according to the process shown in FIG. 1.

Referring to FIGS. 1 and 2 by way of illustration, the cycle is disclosed over a duration of 120 seconds and between a high pressure level of $1.5 \times 10^5$ Pa absolute and a low pressure level of $0.5 \times 10^5$ Pa absolute.

The cycle is here applied to an apparatus comprising two molecular sieve-type adsorbers, 1 and 2, each having inlets 3,4 and outlets 5,6 (the definition given during the said cocurrent circulation, while the functions would be inversed when the circulation is said to be countercurrent from the "outlet" 5 (or 6) towards "inlet" 3 (or 4)).

Each inlet 3,4 is connected on one hand to an air admission conduit 11 by a blower machine or compressor 12, by way of valve 13(14), and on the other hand, by means of valve 17,(18), to an exhaust conduit 15 incorporating a vacuum pump 16. The outlets 5(6) communicate with "outlet" conduits 21,22 connected by means of valves 23,24 to a production conduit 25 through a regulator valve 26 towards a storage accumulator 27, from which, an oxygen distributor conduit 28 extends to provide highly oxygen enriched gas.

The "outlet" conduits 21 and 22 are connected to each other by two conduits 31,32 each incorporating a valve 35,36 and a regulator valve 33,34.

Referring to FIG. 1, the process comprises the following steps and stages, starting from the low pressure level of the cycle, for example, around $0.5 \times 10^5$ Pa absolute:

a partial initial pressurization step $A_1$ countercurrent to the adsorber 1 by means of oxygen coming simultaneously from the adsorber 2 in a decompression stage cocurrently (stage $B_3$ hereunder) and the accumulator 27, such that the pressure attained is in the area of $1 \times 10^5$ Pa absolute (through 34,36 and 26,23);

an adsorption step in three stages:
a final recompression stage $A_2$ of the adsorber 1 by simple admission of air introduced cocurrently (through 11,12,13,3); the pressure attained being about $1.5 \times 10^5$ Pa absolute;
two bleeding stages or productions cocurrently;
an isobaric stage $B_1$ effected by following the admission of air cocurrently and at the high pressure level of the cycle (through 11, 12, 13, 3), with simultaneous bleeding of oxygen enriched gas (through 5, 21,23,25,26), directed to the oxygen storage accumulator 27;
following $B_2$ the preceding stage $B_1$ with the admission of air (through 11,12,13,3), and simultaneous bleeding cocurrently (through 5,21,23,25,26), but with taking off (through 33,35) of at least a part of the bled-off gas as gas of elution, which is introduced countercurrently in the adsorber 2 (stage $C_2$ hereinafter). The fraction of the bled-off gas which is not taken off is directed to the storage accumulator 27. This stage is carried out preferably isobaric to the high pressure level of the cycle;
a partial decompression stage $B_3$ is cocurrent by counterbalancing (through 36,34) the pressures with the other adsorber at its pressurization stage $A_1$ to a pressure of about $1 \times 10^5$ Pa. The transferred gas is an oxygen enriched gas;
a regeneration step effected countercurrently in two stages:
pumping stage $C_1$ (through 3,17,15,16) from the absorber 1 from a pressure of $1 \times 10^5$ Pa to approximately $0.5 \times 10^5$ Pa;
an elution stage $C_2$ (through 33,35,21,5,3,17,15,16), by pumping substantially isobaric to a pressure in the area of $0.5 \times 10^5$ Pa by admission countercurrently of the gas taken off in step $B_2$ by the other adsorber.

Based on the cycle described in relation to FIGS. 1 and 2, several variants can be effected to one or more of the steps without modifying the application or the general features of these steps.

Most of these variants are introduced to adapt this type of cycle in relation to the range of pressure or operating ranges of the apparati, keeping in mind, for example, that it is preferable to start if possible, the pumping stage at atmospheric pressure or again, keeping in mind that the progression of the adsorption front in the adsorber during stages $B_1$ to $B_3$ depends on the "pressure" parameters of the cycle:

the initial pressurization step $A_1$, ($B_3$) provides a pseudo "counterbalancing" between the two adsorbers which can be interrupted before obtaining the equal pressures between the two adsorbers;

the pumping stage $C_1$ can be preceded in the regeneration step by a decompression stage ($C_3$) by opening to air countercurrently if the intermediate pressure at the end of stage $B_3$ is higher than atmospheric pressure;

the elution stage $C_2$ can be effected during increasing or decreasing pressure, depending on the amount of flow drawn off in step $B_2$ and the flow from the pump 16 at the low pressure;

the gas drawn off from stage $B_2$ for the elution $C_2$ can first of all be used to elutriate and then to start off the recompression countercurrently or at an extreme, can be used only for the startup of recompression without any elution. It is known, for instance, that the elution is that much less necessary as the "low" pressure of the cycle is small;

the stage $B_2$ during which the sampling or takeoff can be effected on the bleeding, can be done during pressure reduction and particularly if the flow necessary for the elution and/or the eventual flow from the recompression is greater than that which will be obtained from the isobaric stage $B_2$;

the gas which is bled at the end of the decompression in stage $B_3$ can be recycled cocurrently and treated as air in the event that it is insufficiently oxygen enriched. A counterbalancing exists in $B_3$ and $A_1$ from the said "outlet to inlet" ("top to bottom") (cf. FIG. 4), differently than that described above which is an "outlet to outlet" (top to top). Likewise as above, this counterbalancing need only be partial;

the countercurrent admission into the adsorber of recompressed oxygen coming from the accumulator 27 can be prolonged after step $A_1$ and before step $A_2$ during a supplementary intermediate stage of recompression which consists only of the admission of the oxygen countercurrently, during a supplementary final stage of recompression comprising simultaneously the said countercurrent admission of oxygen from the accumulator 27 and air cocurrently;

all or part of stage $B_3$ during which gas is bled cocurrently, can be effected simultaneously with the start of the regeneration step C during which the gas is bled countercurrently especially by pumping, which provides interest in augmenting the utilization rate of the apparatus (eventually up to 100%). There is thus a partial overlapping of the duration of the two steps $B_3$ and $C_1$ each maintaining its respective function.

Figure 3:
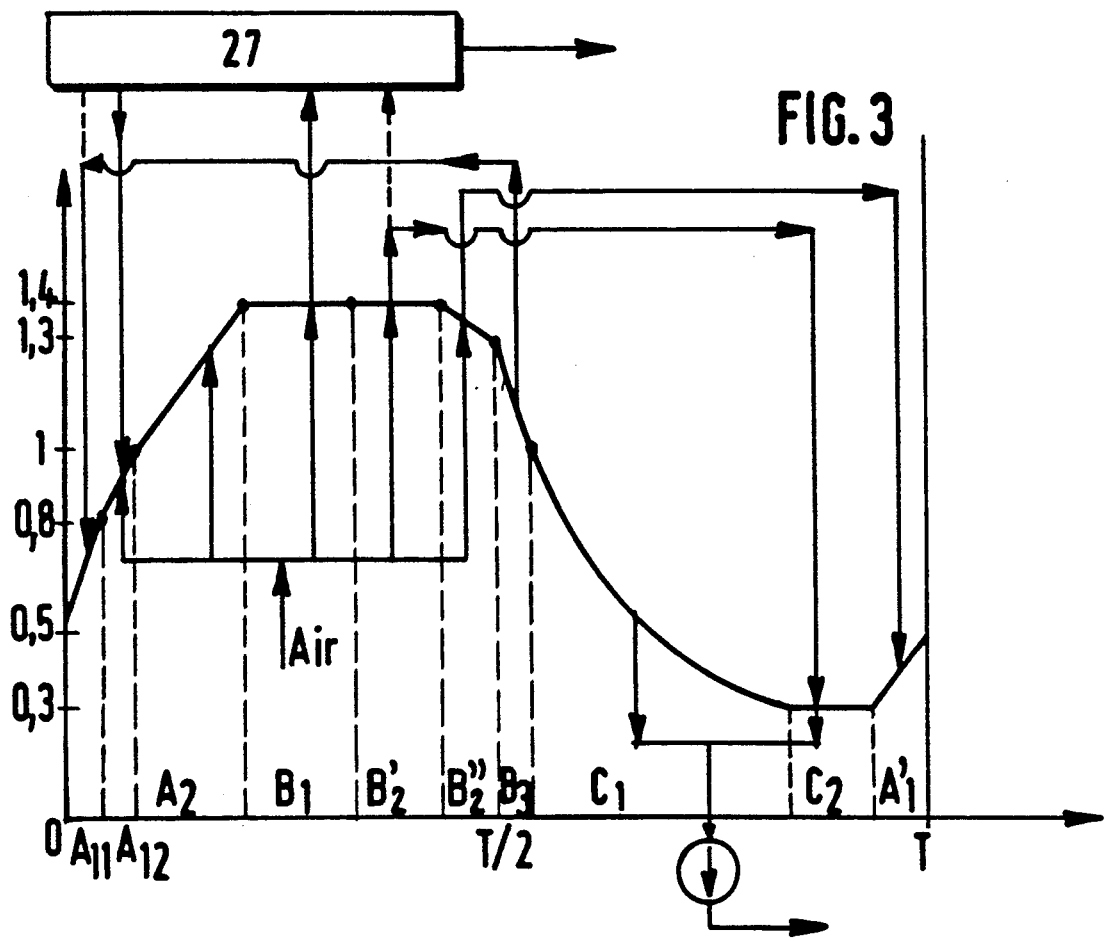
FIGS. 3 and 4 are views similar to FIG. 1 of two embodiments utilizing the process.

For purposes of illustration, FIG. 3 shows an embodiment incorporating several of the variants introduced during the cycle in order to adapt the latter to different pressure conditions from those in FIG. 1. It is noted that the initial pressurization step $A_1$ from the lowest pressure level of the cycle (here approximately $0.3 \times 10^5$ Pa) is split up into a first and second phase $A_1$ and $A_{II}$ of recompression by partial counterbalancing with the second adsorber and a third phase $A_{12}$ by simultaneously introducing gas coming countercurrently from the accumulator 27 and cocurrently the feed air; and that the bleeding stage $B_2$ comprises a first phase $B'_2$ providing the elution ($C_2$) and a second phase $B''_2$ providing to the first recompression stage $A'_1$. As shown in dotted lines, the second recompression phase $A_{II}$ cannot be effected other than by the transfer of gas coming from the other adsorber when in the decompression stage ($B_3$).

Figure 4:
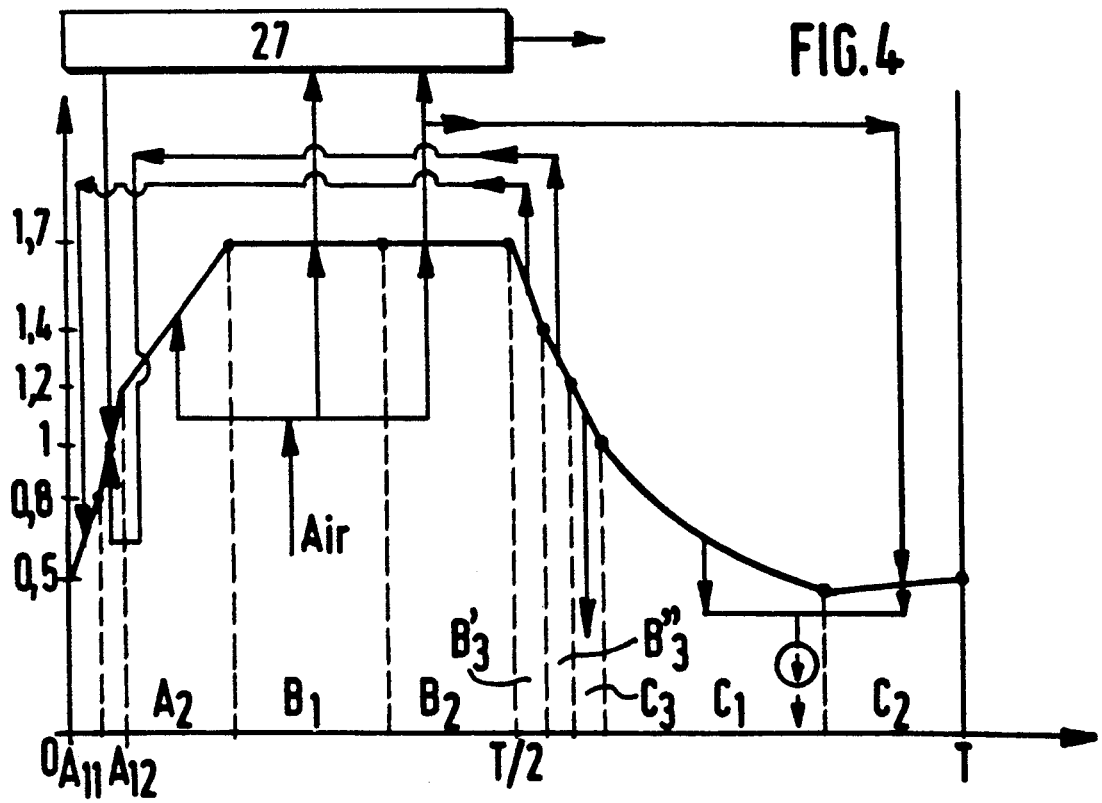

Accordingly, the application according to FIG. 4 is distinguished from that of FIG. 1 in that a stage of open-to-air $C_3$ is provided, prior to pumping $C_1$, $C_2$, an elution $C_2$ which is effected during increasing pressure and before $A_{12'}$, a stage $A'_{12}$ of partial recompression is provided simultaneously by admission countercurrently of a gas coming from the accumulator 27 and by admission cocurrently of the gas bled from the other adsorber at the end of the decompression cocurrently at $B''_3$.

We claim:

1. An adsorptive separation process for the production of oxygen from air through adsorption employing two adsorbers each having an air inlet and an oxygen discharge outlet, each discharge outlet connected to an oxygen accumulator, each adsorber operating over a cycle during a period T, with the operating cycle of one adsorber being shifted relative to the other by T/2, said process comprising the steps of:
    (a) a first pressurization phase from a low pressure level of the cycle below atmosphere pressure up to an intermediate pressure level by admitting oxygen from said accumulator at a pressure above the intermediate pressure level;
    (b) a second pressurization phase from the intermediate pressure level up to substantially a high pressure level of the cycle, above atmospheric pressure, by admitting cocurrently air, without drawing off cocurrently oxygen;
    (c) a production phase substantially at the high pressure level of the cycle, by cocurrently admitting air and drawing of oxygen;
    (d) a cocurrent depressurization phase by interrupting the admission of air;
    (e) a desorption phase by depressurizing countercurrently to the low pressure level of the cycle; and
    wherein oxygen is admitted in the countercurrent direction from said oxygen accumulator and simultaneously from the other adsorber in the cocurrent depressurization phase (d) of the latter throughout all of said first pressurization phase (a).

2. The process of claim 1, wherein the pressure at the end of the cocurrent depressurization phase is near the intermediate pressure level at the end of the first pressurization phase (a).

3. The process of claim 2, wherein the intermediate pressure level is about $1 \times 10^5$ Pa.

4. The process of claim 1, wherein the production phase (c) is substantially isobaric at the high pressure level of the cycle.

5. The process of claim 1, further comprising at the end of the production phase (c) a substantially isobaric elution step to the low pressure level of the cycle.

6. The process of claim 5, further comprising admitting during the elution step oxygen countercurretnly coming from the other adsorber at the end of the production stage of said other adsorber.

7. The process of claim 6, wherein part of the oxygen coming from the other adsorber is simultaneously sent to the oxygen accumulator at the end of the production stage of said other absorber.

8. The process of claim 1, wherein the low pressure level of the cycle is between $0.3 \times 10^5$ Pa and $0.7 \times 10^5$ Pa.

9. The process of claim 8, wherein the high pressure level of the cycle is between $1.2 \times 10^5$ Pa and $2 \times 10^5$ Pa.

10. An adsorptive separation process for the production of oxygen from air through adsorption employing two adsorbers each having an air inlet and an oxygen discharge outlet, each discharge outlet connected to an oxygen accumulator, each adsorber operating over a cycle during a period T, with the operating cycle of one absorber being shifted relative to the other by T/2, said process comprising the steps of:
    (a) a first pressurizaton phase from a low pressure level of the cycle below atmosphere pressure up to an intermediate pressure level by admitting oxygen from said accumulator at a pressure above the intermediate pressure level;
    (b) a second pressurization phase from the intermediate pressure level up to substantially a high pressure level of the cycle, above atmospheric pressure, by admitting cocurrently air, without drawing off cocurrently oxygen;
    (c) a production phase substantially at the high pressure level of the cycle, by cocurrently admitting air and drawing off oxygen;
    (d) a cocurrent depressurization phase by interrupting the admission of air;
    (e) a desorption phase by depressurizing countercurrently to the low pressure level of the cycle; and
    wherein said first pressurization phase (a) includes an initial pressurization sub-step, wherein the admitted oxygen comes from the other adsorber in the cocurrent depressurization phase (d) of the latter and a succeeding pressurization sub-step wherein the admitted oxygen comes from the oxygen accumulator, the oxygen from the adsorber and the oxygen from the accumulator both being supplied in the countercurrent direction.

11. The process of claim 10, wherein during the succeeding pressurization sub-step, air is simultaneously admitted cocurrently.

12. The process of claim 10, wherein during the succeeding pressurization sub-step, oxygen is admitted simultaneously and cocurrently from the other adsorber in its cocurrent depressurization phase (d).

13. An oxygen production process for feeding oxygen to a production line by separation of air, employing two adsorbers each having an air inlet and an oxygen discharge outlet for discharging produced oxygen into an oxygen tank from which extends the production line, each adsorber undergoing a pressure cycle time shifted from the other adsorber and comprising sequentially the steps of:
   (a) an initial pressurization phase wherein the pressure in a first adsorber at a low pressure level of the cycle, less than $0.7 \times 10^5$ Pa, is raised up to an intermediate pressure level by admitting countercurrently oxygen coming simultaneously from the other adsorber in a depressurization phase (d) and from the tank;
   (b) a final pressurization phase wherein the pressure of the first adsorber is raised substantially to a high pressure level of the cycle, above atmospheric pressure, by admitting feed air cocurrently while the outlet is closed;
   (c) a production phase substantially at the high pressure level of the cycle, wherein oxygen is supplied to the tank;
   (d) a cocurrent depressurization phase wherein oxygen from the first adsorber is supplied countercurrently to the other adsorber in its initial pressurization phase; and
   (e) a countercurrent desorption phase down to the low pressure level of the cycle wherein the air inlet is connected to a vacuum pump.

14. The process of claim 13 further including, during the end of the countercurrent desorption phase (e), an elution phase wherein oxygen produced by the other adsorber at the end of its production phase (c) is admitted to the first adsorber countercurrently.

15. The process of claim 13, wherein the high pressure level of the cycle is between $1.2 \times 10^5$ Pa and $2 \times 10^5$ Pa.

16. An oxygen production process for feeding oxygen to a production lien by separation of air, employing two adsorbers each having an air inlet and an oxygen discharge outlet for discharging produced oxygen into an oxygen tank from which extends the production line, each adsorber undergoing a pressure cycle time shifted from the other adsorber and comprising sequentially the steps of:
   (a) a first pressurization phase wherein the pressure in a first adsorber at a low pressure level of the cycle, not higher than $0.7 \times 10^5$ Pa, is increased in a first step by admitting countercurrently oxygen coming from the other adsorber in a depressurization phase (d) and in a second step by introducing oxygen countercurrently from the tank;
   (b) a final pressurization phase wherein the pressure of the first adsorber is raised substantially to a high pressure level of the cycle, not higher than $2 \times 10^5$ Pa, by admitting feed air cocurrently while closing the outlet; p1 (c) a production phase substantially at the high pressure level of the cycle, wherein oxygen is supplied to the tank;
   (d) a cocurrent depressurization phase wherein oxygen from the first adsorber is supplied countercurrently to the other adsorber in its first pressurization phase; and
   (e) a countercurrent desorption phase down to the low pressure level of the cycle.

17. The process of claim 16, including, during the end of the countercurrent desorption phase (e), an elution phase, the inlet of the first adsorber is connected to a vacuum source and, simultaneously, oxygen produced by the other adsorber at the end of its production phase (c) is admitted countercurrently to said first adsorber.

18. The process of claim 17, wherein during at least part of the first step of the first pressurization phase (a) admitted oxygen comes simultaneously from the tank.

19. The process of claim 17, wherein during the second step of phase (a) feed air is introduced cocurrently simultaneously to countercurrent introduction of oxygen coming from the tank.

20. The process of claim 17, wherein during the second step of the first pressurization phase (a) oxygen coming from the other adsorber in its depressurization phase (d) is introduced cocurrently simultaneously to the countercurrent oxygen coming from the tank.

21. The process of claim 16, wherein the high pressure level of the cycle is not less than about $1.2 \times 10^5$ Pa.

* * * * *

UNITED STATES PATENT AND TRADEMARK OFFICE
CERTIFICATE OF CORRECTION

PATENT NO. : 5,223,004

DATED : June 29, 1993

INVENTOR(S) : Sylvie Eteve et al.

It is certified that error appears in the above-indentified patent and that said Letters Patent is hereby corrected as shown below:

Claim 1, Column 6, line 3, change "of" to --off--.

Claim 6, Column 6, line 26, correct the spelling of "countercurrently".

Claim 10, Column 6, line 44, change "absorber" to --adsorber--.

Claim 16, Column 8, line 20, before "(c)" delete "pI".

Signed and Sealed this

Twenty-fifth Day of January, 1994

Attest:

BRUCE LEHMAN

*Attesting Officer*    *Commissioner of Patents and Trademarks*